US007163722B2

(12) United States Patent

Sedenszki et al.

(10) Patent No.: US 7,163,722 B2

(45) Date of Patent: Jan. 16, 2007

(54) DEVICE AND METHOD FOR COATING SERPENTINE FLUORESCENT LAMPS

(75) Inventors: Istvan Sedenszki, Fairfield, CT (US); George Kovacs, Wallingford, CT (US)

(73) Assignee: LCD Lighting, Inc., Orange, CT (US)

( * ) Notice: Subject to any disclaimer, the term of this patent is extended or adjusted under 35 U.S.C. 154(b) by 388 days.

(21) Appl. No.: 10/741,879

(22) Filed: Dec. 19, 2003

(65) Prior Publication Data

US 2005/0136194 A1 Jun. 23, 2005

(51) Int. Cl.
*B29C 35/08* (2006.01)

(52) U.S. Cl. ........................ 427/598; 427/64; 427/157; 427/230

(58) Field of Classification Search ................ 427/598, 427/64, 157, 230
See application file for complete search history.

(56) References Cited

U.S. PATENT DOCUMENTS 2,827,391 A 3/1958 Van Der Wolf et al.
4,024,295 A * 5/1977 Chase et al. ................ 427/598
4,064,291 A 12/1977 Kuijer et al.
4,265,950 A 5/1981 Graff
4,597,984 A 7/1986 Jansma
4,804,327 A * 2/1989 Miller ........................ 434/409
5,209,946 A 5/1993 Lowther et al.
5,344,667 A * 9/1994 Seder .......................... 427/67
5,441,774 A 8/1995 Dutta et al.

* cited by examiner

*Primary Examiner*—Alain L. Bashore
(74) *Attorney, Agent, or Firm*—Fattibene & Fattiben; Paul A. Fattibene; Arthur T. Fattibene

(57) ABSTRACT

A serpentine tube used in the manufacture of a fluorescent lamp is coated with a reflective or phosphor material. A magnetic material and coating material slurry is placed within one end of a serpentine glass tube. A magnet is placed adjacent the magnetic material and coating material slurry and is moved in a path conforming to the shape of the serpentine tube. The magnet causes the magnetic material and coating material slurry to travel along therewith, coating a portion of the interior surface of the serpentine tube with a reflective, phosphor, or other material. In another embodiment of the invention, abrasive magnetic material is placed within the serpentine lamp for removing a previously coated material resulting in an aperture being formed. The present invention is particularly suited to the manufacture of serpentine fluorescent lamps that are used to illuminate flat panel displays.

7 Claims, 6 Drawing Sheets

DEVICE AND METHOD FOR COATING SERPENTINE FLUORESCENT LAMPS

FIELD OF THE INVENTION

The present invention relates in general to the manufacture of serpentine fluorescent lamps, and more particularly to the coating of a serpentine fluorescent lamp with a material such as a reflective coating or phosphor material.

BACKGROUND OF THE INVENTION

Fluorescent lamps are widely used in many lighting applications. In the manufacture of a fluorescent lamp, a phosphor coating is often required to be placed on the interior surface of the lamp. Generally, fluorescent lamps are made from straight glass tubes. The interior surface of the glass tube is often easily coated by placing within the glass tube a liquid phosphor material and tilting or rotating the glass tube. Other coating techniques have also been used. For example, one end of the tube may also be immersed in a quantity of liquid phosphor and a vacuum used to draw the liquid phosphor up the interior of the tube, and then removing the vacuum causing the liquid phosphor to drain out of the tube leaving a coating on the interior surface of the glass tube. Reflective coatings are also often used.

However, there are many lamps used for special applications, which require unique or unusual configurations. One such lamp is a serpentine lamp used in illuminating planar surfaces with substantially even illumination. It is often difficult to coat the serpentine fluorescent lamp with a reflective coating or phosphor material due to the numerous curves or bends. Therefore, there is a need for an improved device and method for the coating of the interior surface of the serpentine lamp with reflective coating or a phosphor material.

SUMMARY OF THE INVENTION

The present invention is directed to a device for coating the interior surface of a serpentine tube for use as a lamp. The present invention comprises a plate for positioning and holding a serpentine tube thereon. A magnet is positioned under the plate and moved in a pattern to conform to the shape of the serpentine tube. A magnetic material and coating material slurry is placed within one open end of the serpentine tube. The magnet is positioned under the magnetic material and coating material slurry. The magnet attracts the magnetic material and coating material slurry so that when the magnet is moved, the magnetic material and coating material slurry follows the magnet. A coating material is caused to be deposited on the interior surface of the serpentine tube as the magnetic material and coating material slurry travels along the interior of the serpentine tube. The coating material may be either a reflector or a phosphor material.

In another embodiment of the invention, an aperture may be formed in a serpentine tube that has previously been coated. Abrasive magnetic material is placed in one end of the serpentine tube. A magnet placed adjacent the abrasive magnetic material is moved in a path conforming to the shape of the serpentine tube causing the abrasive magnetic material to move along the interior of the serpentine tube. The moving abrasive magnetic material removes a portion of the previously applied coating forming an aperture.

Accordingly, it is an object of an embodiment of the present invention to coat the interior surface of a serpentine tube with a coating material for use in making a fluorescent lamp.

It is another object of an embodiment of the present invention to coat the interior surface of a serpentine tube with a reflective material.

It is another object of an embodiment of the present invention to remove a selected portion of a coating in a serpentine tube for making a lamp having an aperture.

It is an advantage of the present invention that there is little waste of the coating material.

It is another advantage of the present invention that a reflective material can be placed on circumferential portion of a serpentine tube.

It is a further advantage of the present invention that a phosphor coating can easily be applied to a serpentine tube without utilizing the force of gravity to move the liquid phospor.

It is a feature of the present invention that a magnetic material is used in combination with a moving magnet.

It is another feature of the present invention that the magnet is moved in a path so as to conform to the shape of the serpentine tube.

These and other objects, advantages, and features will become readily apparent in view of the following detailed description.

DETAILED DESCRIPTION OF THE PREFERRED EMBODIMENTS

Figure 1:
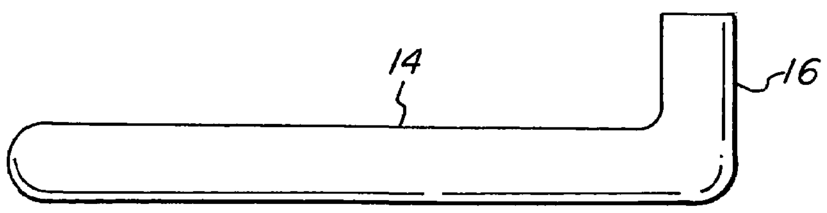
FIG. 1 is an elevational view of a serpentine tube used in the manufacture of a fluorescent lamp.

FIG. 1 illustrates a serpentine tube 14 having a leg 16 used in forming a fluorescent lamp. The tube 14 may be made of any type of glass required for the particular application. In the manufacture of a fluorescent lamp, a phosphor or reflective coating is ordinarily applied to the interior surface of the lamp. The phosphor or reflective material is generally suspended or in solution in a liquid during coating, and then permitted to dry leaving the phosphor or reflective coating. Electrodes are placed at either end of the lamp so that when the electrodes are energized, an electric arc between the electrodes causes the phosphor coating to radiate. The reflective coating aids in directing and concentrating the illumination in a predetermined direction. The electrodes are usually placed at the ends of the lamp and mounted on legs 16. The configuration of the serpentine lamp 14 and the placement of legs 16 make it particularly difficult to coat the interior surface of the serpentine lamp 14 with a reflective or phosphor coating.

Figure 2:
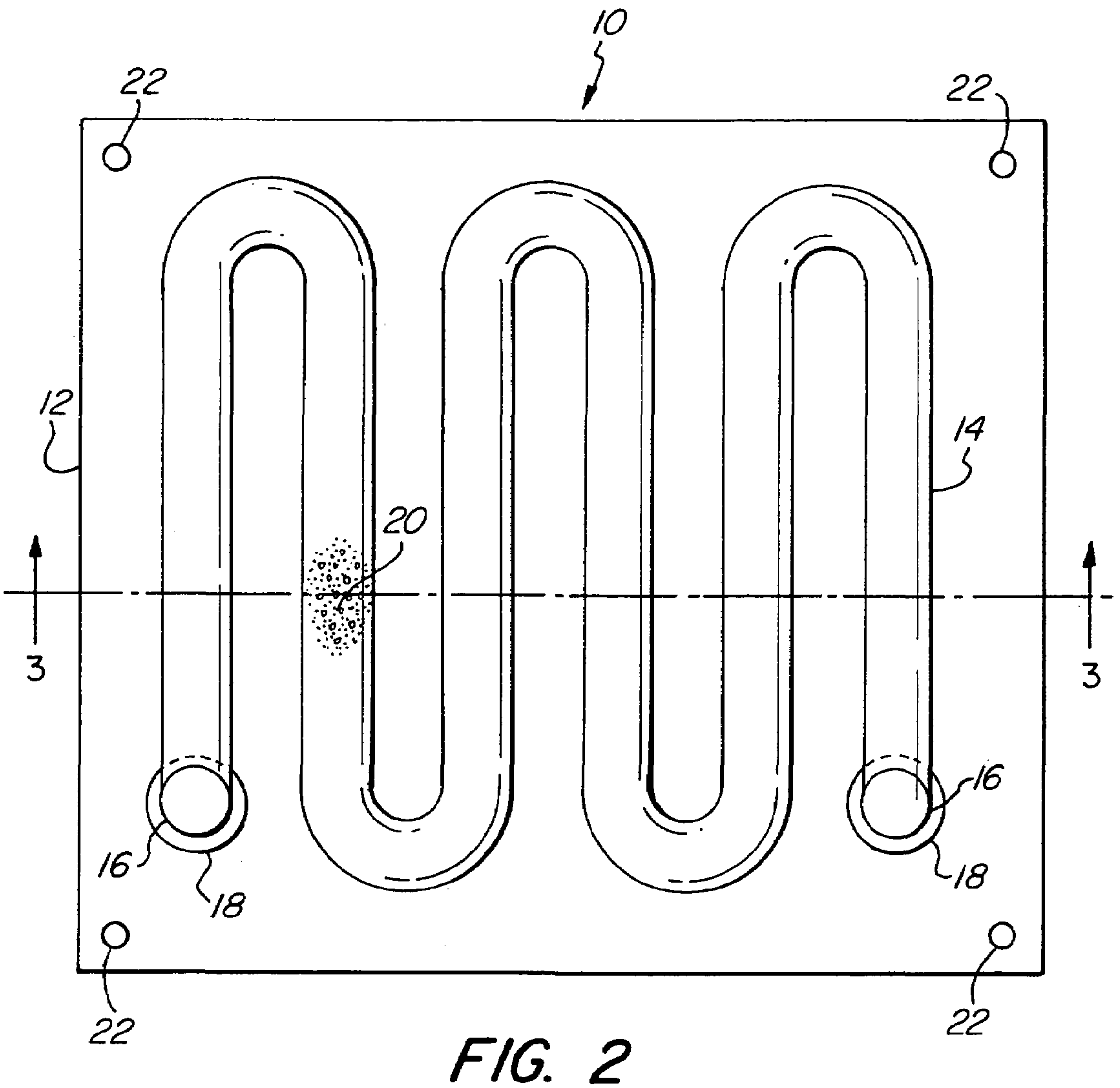
FIG. 2 is a plan view of an embodiment of the present invention.

FIG. 2 is a plan view illustrating a serpentine tube coating device 10 with a serpentine tube 14 placed thereon. The top plate 12 supports the serpentine tube 14. The legs 16 of the serpentine tube 14 are placed over or in holes 18 formed in the top plate 12, depending upon which portion of the surface of the serpentine tube 14 is to be coated with a material. Below the top plate 12, a movable magnet is positioned. A magnetic material and coating material slurry 20, which may be a reflective, phosphor, or other desired material, is placed within the interior of the serpentine tube 14. Fasteners 22 are used to hold the underlying structure to top plate 12.

Figure 3:
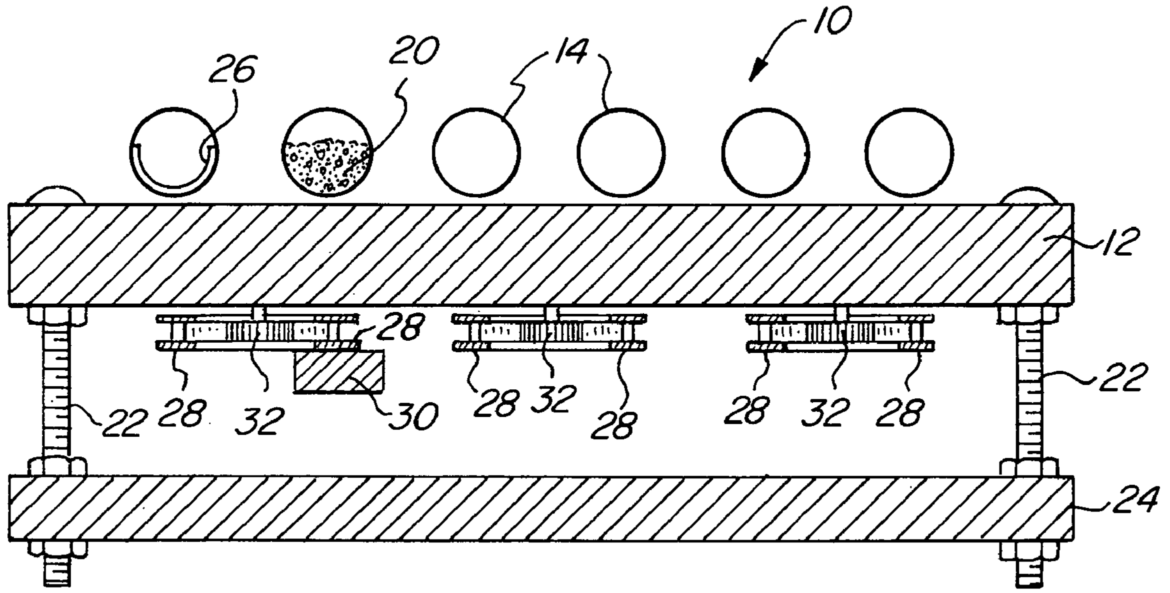
FIG. 3 is a cross section taken along line 3—3 in FIG. 2.

FIG. 3 is a cross section taken along line 3—3 in FIG. 2. In FIG. 3, a portion of means for moving a magnet is more clearly illustrated. The serpentine tube 14 is supported and held by top plate 12. A bottom plate 24 is held and separated from the top plate 12 with fasteners 22. Between the top plate 12 and the bottom plate 24 is located means for moving a magnet 30. Magnet 30 may be a permanent magnet, electromagnet or any other equivalent type of magnet. Magnet 30 is positioned under or adjacent the magnetic material and coating material slurry 20 contained within a portion or segment of the serpentine tube 14. The magnetic material and coating material slurry 20 comprises a reflective, phosphor, or other coating material held in suspension or solution with a liquid or solvent. The liquid coating material is mixed with small particles of magnetic material, such as iron filings or small iron spheres. The magnet 30 is attached to a chain drive 28. The chain drive 28 is guided by a plurality of sprockets 32 so as to direct the magnet 30 in a motion conforming to the shape of the serpentine tube 14. Accordingly, the magnet 30 is caused to move adjacent the serpentine tube 14 from one end of the serpentine tube 14 to the other end. The magnetic material contained within the magnetic material and coating material slurry 20 is caused to follow the moving magnet 30 due to the magnetic attraction to the magnetic material. A trail of coating material is left behind coating the interior surface of the serpentine tube 14 over a portion of its internal circumference.

Figure 4:
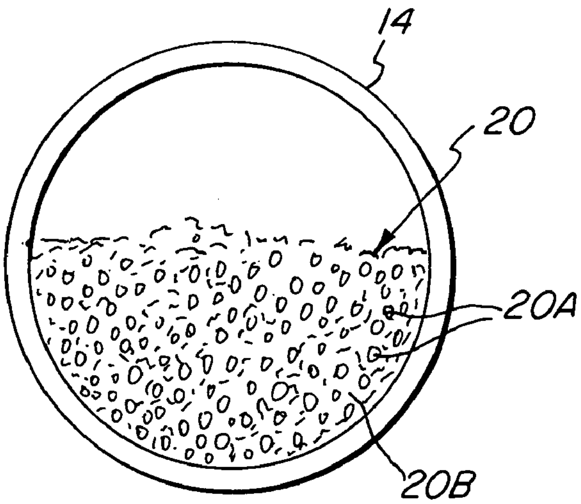
FIG. 4 is an enlarged view schematically illustrating the magnetic material and coating material slurry.

FIG. 4 schematically illustrates an enlarged view of the interior of the serpentine tube 14 and the magnetic material and coating material slurry 20. The magnetic material and coating material slurry 20 comprises magnetic material 20A and a liquid coating material 20B. The magnetic material 20A may be any material exhibiting ferromagnetism, such as ion, cobalt, nickel, or alloys of these materials. The magnetic material 20A is preferable relatively small, yet sufficiently large so as to permit easy removal from the liquid phosphor 20B when desired.

Figure 5:
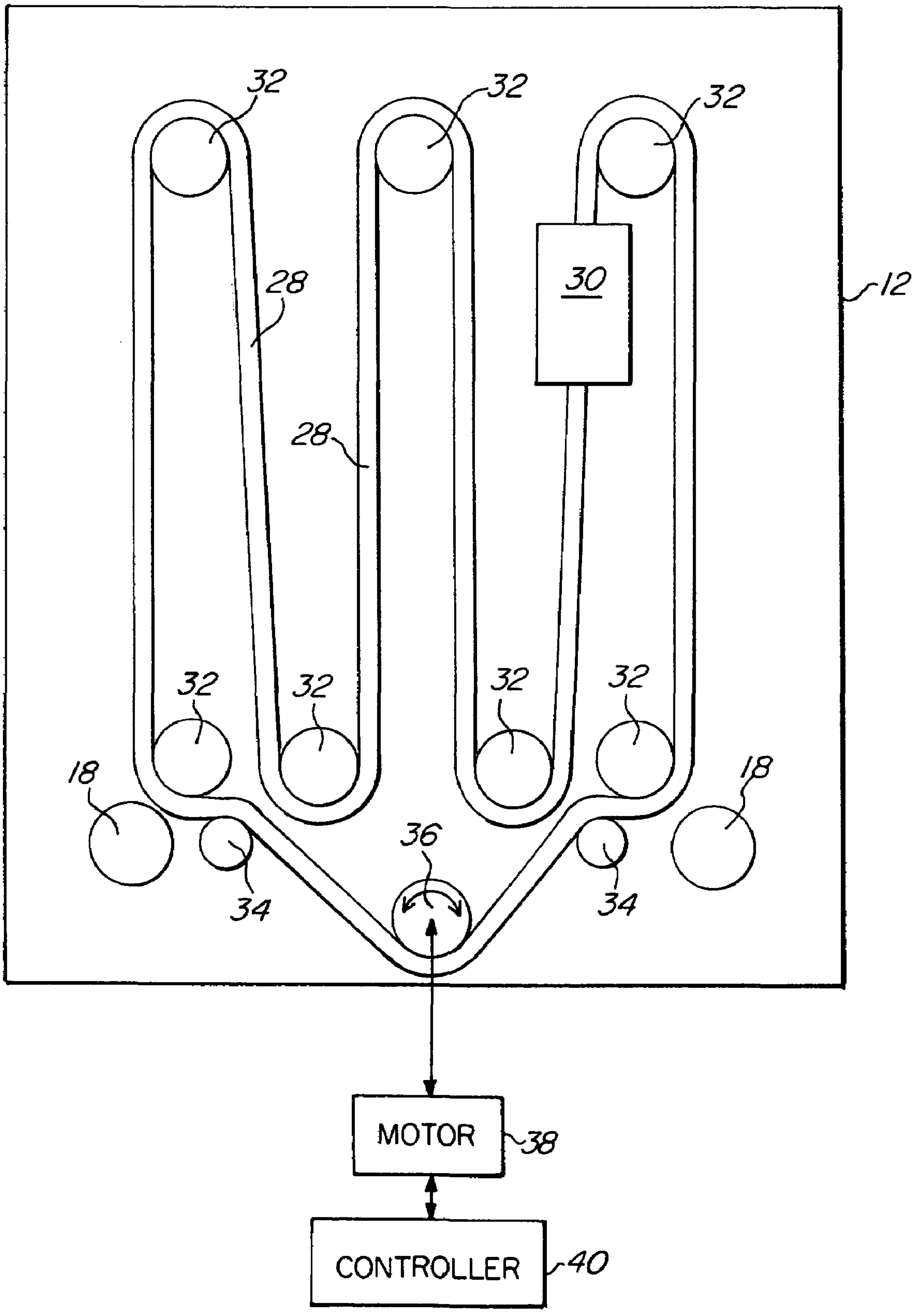
FIG. 5 schematically illustrates the underside of an embodiment of the present invention illustrated in FIGS. 2 and 3.

FIG. 5 is a plan view schematically illustrating means for moving a magnet 30 mounted below the top plate 12. The top plate 12 is preferably made of a relatively thin material that may or may not have magnetic properties. The top plate 12 should be made of a material that either conducts the magnetic field created by the magnet 30, or permits the magnetic field to pass there through or easily propagates a magnetic field. The magnet 30 is mounted on a chain drive 28. The chain drive 28 is guided around sprockets 32. Guide rollers 34 direct the chain drive 28 to a drive sprocket 36. The drive sprocket 36 is driven by a motor 38 which is controlled by a controller 40. The motor 38 and controller 40 are capable of driving the chain drive 28 in a forward or reverse direction so that the magnet 30 attached thereto can be positioned along any portion of the movable path of the magnet 30. The path of the magnet 30 conforms to the shape of the serpentine tube or other shaped tube being coated.

Generally, when coating the serpentine tube with a reflective material, only about one half of the circumference is coated and a single pass may be used. However, when a phosphor coating is desired, generally, the entire circumference is coated. Holes 18 formed in top plate 12 permit a leg of the serpentine tube, not shown, to pass therethrough when the serpentine tube is rotated or flipped for coating another portion of the interior circumference thereof with phosphor.

It should be appreciated that while this embodiment of the present invention has been illustrated with magnet 30 placed on the chain drive 28 and a magnetic material placed within the serpentine tube 14, it may be possible to place a magnet within the serpentine tube 14 and use a movable magnetic material positioned on the drive chain 28. Additionally, the drive chain 28 may be another type of drive, such as a belt, as long as the magnet 30 is directed in a path to conform to the shape of the tube being coated.

Figure 6:
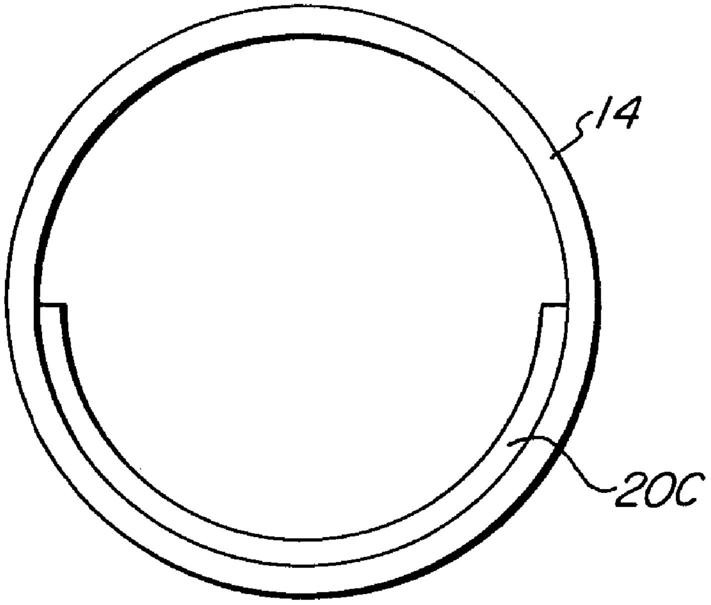
FIG. 6 schematically illustrates a coating applied according to the teaching of the present invention.

FIG. 6 is a cross section illustrating a coating 20C formed on a circumferential portion of the interior of the serpentine tube 14. After the magnetic material and coating material slurry passes through the serpentine tube 14 by being attracted to the moving magnet, a trail or coating of the coating material is left behind. When this coating material dries, the material coating 20C is formed. Different quantities of magnetic material and coating material slurries may be used so as to coat different circumferential portions within the serpentine tube 14. Generally, at least one half of the circumferential portion of the serpentine tube 14 is coated during movement of the magnetic material and coating material slurry within the serpentine tube. If desired for a phosphor coating, the serpentine tube is then rotated or flipped over on the top plate so as to coat the other circumferential half portion of the serpentine tube 14.

This embodiment of the present invention greatly facilitates the coating of the interior of a serpentine tube or other multi-curved shaped tube with a reflective, phosphor, or other coating. Prior to the present invention the coating of a serpentine tube with material was difficult and often required manipulating the serpentine tube manually in a time consuming and tiring process of twisting and turning in an effort to adequately coat the interior surface. The present invention makes possible an automated coating process that reduces manual labor. Additionally, the present invention is particularly suited to the coating of a reflective material over a portion of the circumference of the serpentine tube.

Figure 7:
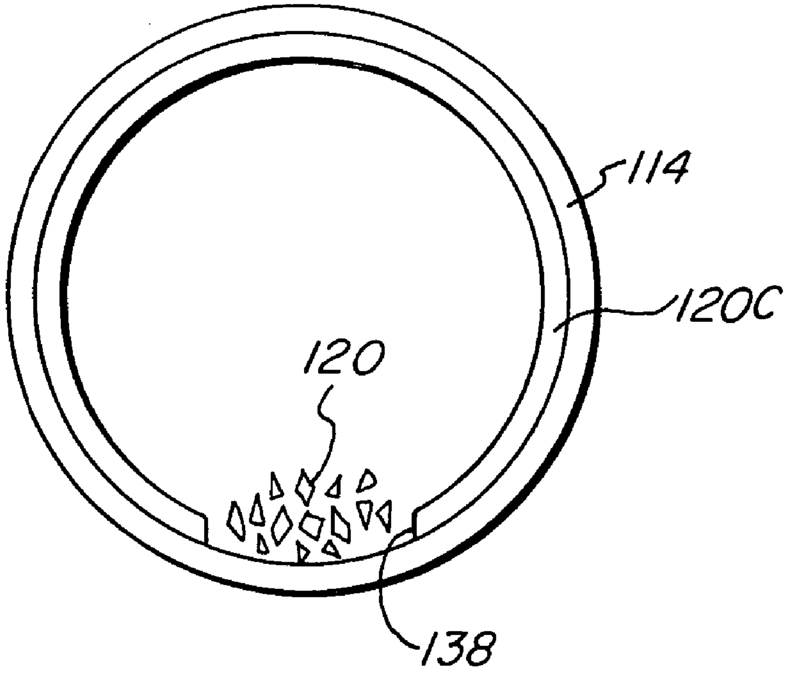
FIG. 7 schematically illustrates an embodiment of the present invention utilizing an abrasive magnetic material.

FIG. 7 schematically illustrates another embodiment of the present invention in which an abrasive magnetic material 120 is utilized to remove a portion of a previously applied coating 120C so as to form an aperture 138. The abrasive magnetic material 120 is caused to move within the serpentine tube 114 by a moving magnet, not shown, but as previously illustrated, in FIG. 5. However, rather than coating the interior of the serpentine tube 114 with a magnetic material and coating material slurry, a previously applied coating 120C is removed by the cutting force of the abrasive magnetic material 120. The previously applied coating 120C is thereby removed from a predetermined portion of the interior of the serpentine tube 114, forming the aperture 138. This embodiment of the present invention makes possible the formation of an aperture 138 in a previously coated serpentine tube 114, where otherwise the formation of an aperture would be very difficult. The aperture may extend the length of the serpentine tube 114 or only a portion thereof. In some applications, a lamp having an aperture is desirable.

Figure 8:
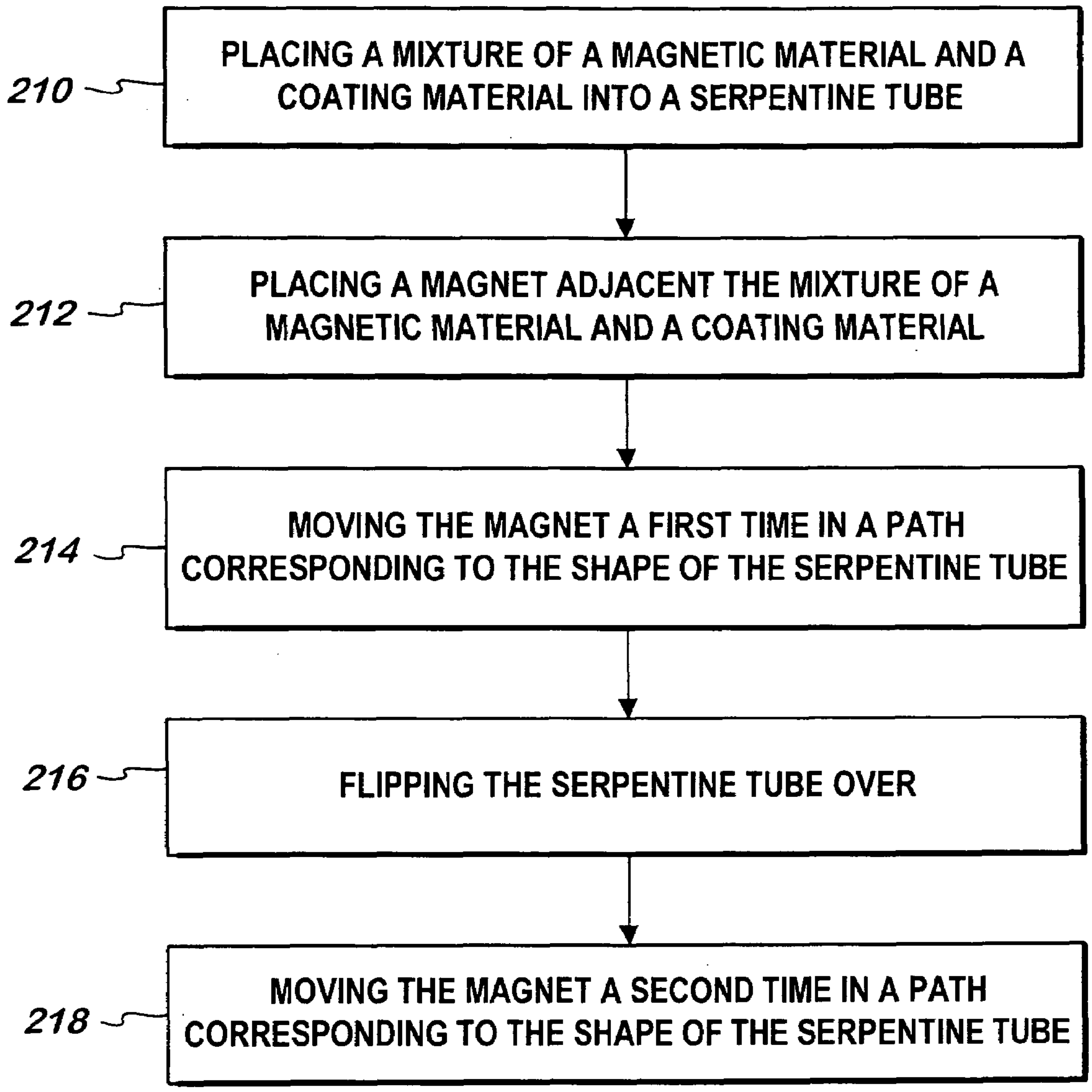
FIG. 8 is a block diagram illustrating the method steps of an embodiment of the present invention.

FIG. 8 is a block diagram illustrating the method steps or acts in an embodiment of the present invention. Block 210 represents the method step or act of placing a magnetic material and coating material slurry in a serpentine glass tube. Block 212 represents the act of placing a magnet adjacent the magnetic material and coating material slurry in the serpentine glass tube. Block 214 represents the step or act of moving the magnet in a path corresponding to the shape of the serpentine glass tube.

Block 216 represents the act of flipping or rotating the serpentine glass tube for coating a different circumferential portion of the interior surface of the serpentine tube. Block 218 represents the act of moving the magnet adjacent the magnetic material and coating material slurry in the serpentine tube in a path corresponding to the shape of the serpentine tube, thereby coating the other circumferential portion of the interior surface of the serpentine tube.

Figure 9:
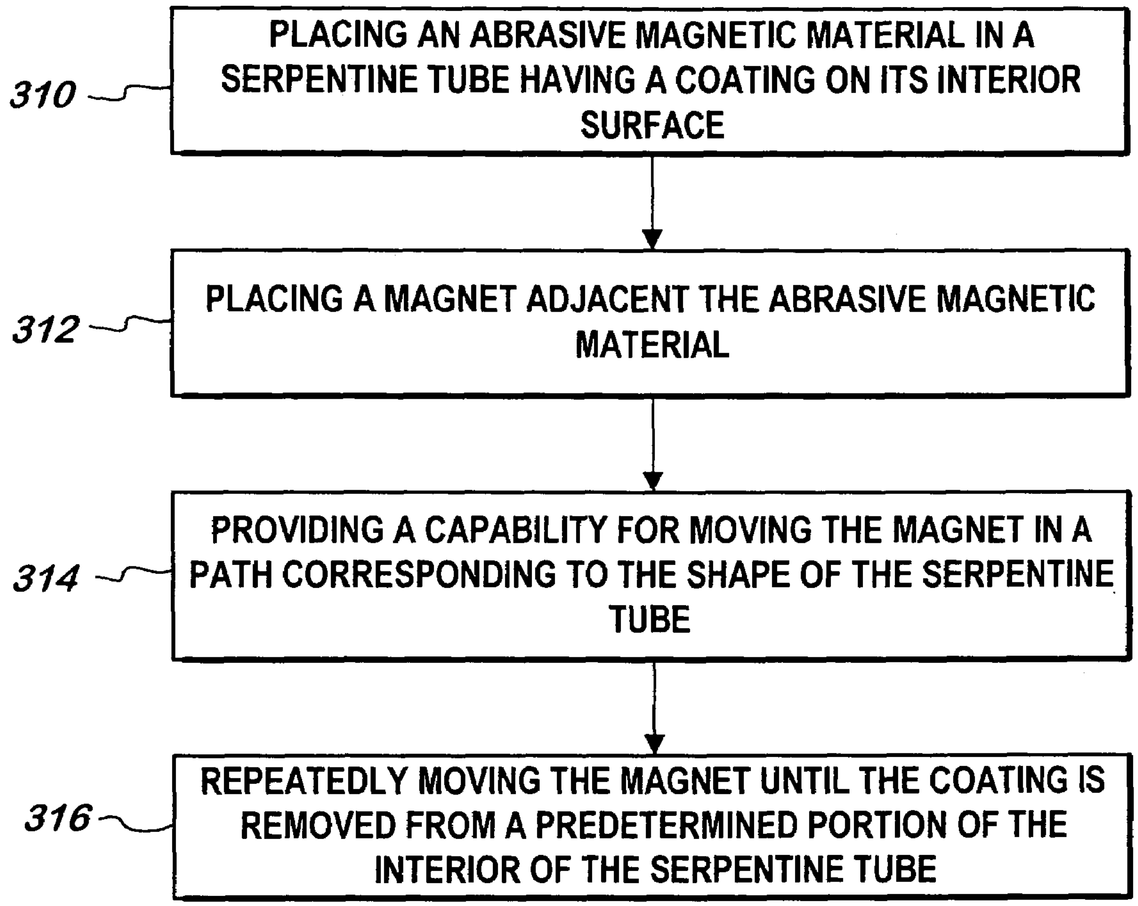
FIG. 9 is a block diagram illustrating the method steps of another embodiment of the present invention.

FIG. 9 is a block diagram illustrating the method steps or acts in another embodiment of the present invention utilized to remove a portion of the previously coated surface on the interior of a serpentine tube. Block 310 represents the step or act of placing an abrasive magnetic material in a serpentine tube that has previously been coated on its interior surface. The coating is generally a phosphor coating, but may be another type of coating. Block 312 illustrates the method step of placing a magnet adjacent the abrasive magnetic material. Block 314 represents the step or act of providing the capability for moving the magnet in a path corresponding to the shape of the serpentine tube or a desired predetermined aperture shape. Block 316 represents the step or act of repeating movement of the magnet until the coating is removed from the predetermined portion of the serpentine tube forming the desired aperture shape.

The present invention makes possible the coating of the interior surface of a serpentine tube. Additionally, in another embodiment of the present invention, utilizing an abrasive magnetic material makes possible the formation of apertures within a serpentine tube that has previously been coated. Therefore, the present invention provides a device for working on the interior surface of a curved tube. The term working on is intended to include either removing or adding a coating to the interior surface of a tube. The term serpentine tube is intended to include a tube having at least two curved sections.

While the present invention has been described with respect to a moving magnet moving in a path conforming to the shape of the serpentine tube, it might be possible to utilize a magnet placed within the serpentine tube and a magnetic material moving along the path conforming to the shape of the serpentine tube. Additionally, while the present invention has been described with respect to the coating of a reflective or phosphor material, it should be appreciated that any coating may be applied to the interior surface of the serpentine tube, as long as the magnetic material is capable of moving the material to be coated therewith. It should be appreciated that it may require several passes of the magnetic material and coating material slurry in order to achieve a desired coating thickness.

Additionally, although the preferred embodiments have been illustrated and described, it will be obvious to those skilled in the art that various modifications may be made without departing from the spirit and scope of this invention.

What is claimed is:

1. A method of working a curved tube comprising the steps of:

supporting the curved tube having a shape;

placing a magnet adjacent the curved tube;

inserting a magnetic material in the curved tube;

moving the magnet in a path conforming to the shape of the curved tube, whereby the interior surface of the curved tube is worked.

2. A method of working a curved tube as in claim 1 comprising the further step of:

mixing a reflective material with said magnetic material.

3. A method of working a curved tube as in claim 1 comprising the further step of:

mixing a phosphor material with said magnetic material.

4. A method of working a curved tube as in claim 1 wherein:

the magnetic material comprises an abrasive magnetic material.

5. A method of coating a serpentine glass tube having open ends used in the manufacture of a fluorescent lamp comprising the steps of:

supporting the serpentine glass tube on a plate;

placing a magnet mounted on a drive mechanism adjacent the serpentine glass tube;

placing a magnetic material and reflective material slurry within one end of the open ends of the serpentine glass tube;

moving the magnet with the drive mechanism a first time in a path corresponding to the shape of the serpentine glass tube, whereby a circumferential portion of the serpentine glass tube is coated with a reflective coating; and removing the magnetic material and reflective material slurry from within the serpentine glass tube, whereby a reflective coating is placed on the circumferential portion of the interior surface of the serpentine glass tube.

6. A method of coating a serpentine glass tube having open ends used in the manufacture of a fluorescent lamp as in claim 5 wherein:

the circumferential portion is substantially one half of the circumference of the serpentine glass tube.

7. A method of coating a serpentine glass tube having open ends used in the mannfacture of a fluorescent lamp comprising the steps of:

supporting the serpentine glass tube on a plate;

placing a magnet mounted on a drive mechanism adjacent the serpentine glass tube;

placing a magnetic material phosphor slurry within one end of the open ends of the serpentine glass tube;

moving the magnet with the drive mechanism a first time in a path corresponding to the shape of the serpentine glass tube, whereby a first portion of the serpentine glass tube is coated with a phosphor;

flipping the glass tube over;

moving the magnet with the drive mechanism a second time in a path corresponding to the shape of the serpentine glass tube, whereby a second portion of the serpentine glass tube is coated with a phosphor; and removing the magnetic material phosphor slurry from within the serpentine glass tube, whereby a phosphor coating is placed on the interior surface of the serpentine glass tube.

* * * * *